Aug. 29, 1933.        R. M. ZIMBER ET AL        1,924,532
MACHINE FOR SEALING
Filed Sept. 12, 1929        3 Sheets-Sheet 1

Aug. 29, 1933.        R. M. ZIMBER ET AL        1,924,532
MACHINE FOR SEALING
Filed Sept. 12, 1929        3 Sheets-Sheet 2

INVENTORS
Raymond M. Zimber
BY Amis A. Hawthorne
Darby & Darby
their ATTORNEYS

Aug. 29, 1933.  R. M. ZIMBER ET AL  1,924,532
MACHINE FOR SEALING
Filed Sept. 12, 1929   3 Sheets-Sheet 3
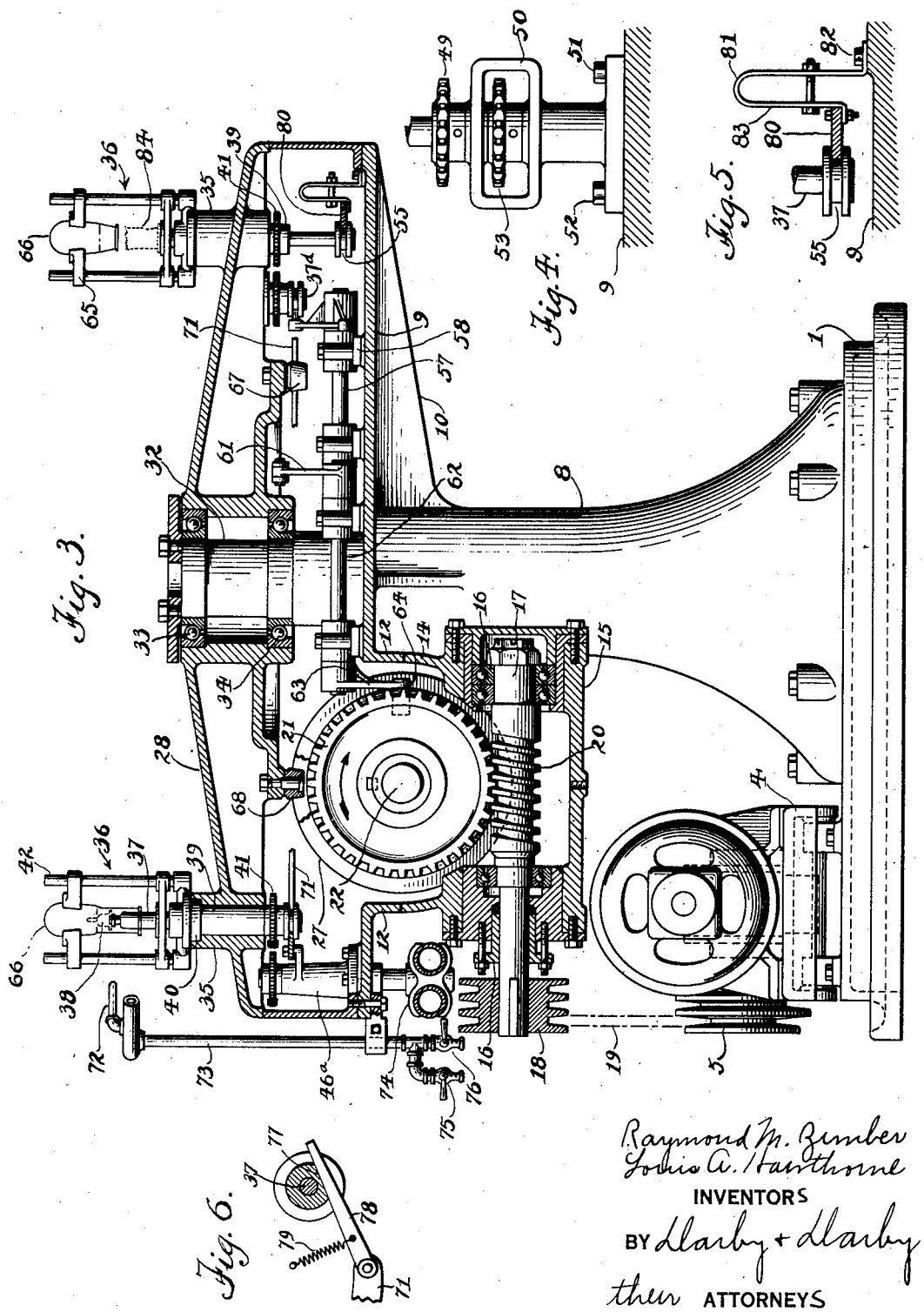

Patented Aug. 29, 1933

1,924,532

UNITED STATES PATENT OFFICE 1,924,532

MACHINE FOR SEALING

Raymond M. Zimber, Bloomfield, and Louis A. Hawthorne, Newark, N. J., assignors to DeForest Radio Company, Jersey City, N. J., a corporation of Delaware Application September 12, 1929
Serial No. 392,136

20 Claims. (Cl. 49—2)

This invention relates to sealing machinery and with particularity to methods and means for sealing containers such as lamps, audions and similar devices.

An object of the invention is to provide a machine for uniting and sealing the stem portion of a lamp to the main or envelope portion thereof.

A feature of the invention relates to a sealing machine having means for automatically and uniformly heating the parts to be sealed.

Another feature of the invention relates to a machine for sealing the stem and envelope portions of a lamp and similar devices, together with novel means for automatically bringing the parts to be sealed into proper relation to each other for the sealing operation.

Another feature has reference to a lamp sealing machine of the rotary head type, having means for accurately indexing the head to each of a plurality of successive positions for different working operations.

A further feature relates to a sealing machine for lamps or similar articles, employing a rotary head and a plurality of lamp holders which are rotated to present uniformly to the sealing fires the portions of the lamps to be sealed, and means for insuring that said lamp holders are in convenient position to permit the machine to be loaded and unloaded.

Another feature relates to a plurality of lamp holders adapted to be revolved as a unit about a vertical axis and to be individually rotated about their respective axes by a continuous chain, belt or other similar transmission.

Another feature relates to a sealing machine for lamps or similar articles having a reciprocable stem or mount holder, together with means for accurately raising and lowering said holder at predetermined points in the operation of the machine.

A further feature relates to a sealing machine of the rotary head type which is rapid and efficient in operation and wherein the rotary head encloses the main operating mechanism and the attendant is thus protected from injury due to contact with moving parts, etc.

A still further feature relates to the novel transmission mechanism for rotating the movable head of a lamp sealing machine.

The invention also relates to the organization, arrangement and relative locations of the various parts which go to make up an efficient, accurate and easily operated machine for sealing lamps, audions and similar articles.

Other features and advantages not specifically enumerated will be apparent after a consideration of the following detailed descriptions and the appended claims.

While the invention will be disclosed hereinafter as applied to a machine for sealing the so-called stem or mount portion of an audion to the main envelope portion thereof, it will be understood that the various features of the invention are equally applicable to the sealing or uniting of any other portions of devices such as lamps, audions, etc.

Referring to the drawings—

Fig. 3 is a vertical view in elevation and partial section showing the interior arrangement of the driving mechanisms and the means for raising and lowering the mount holder according to the invention;

Fig. 4 is a detail view of the adjustable gear bracket for taking up slack in the driving chains;

Fig. 5 is a detail view of one of the tracks for preventing the mount holders rotating during one part of the rotary movement of the main head;

Fig. 6 is a detail view showing how the mount rod assemblies are brought into proper position for loading;

Figure 1:
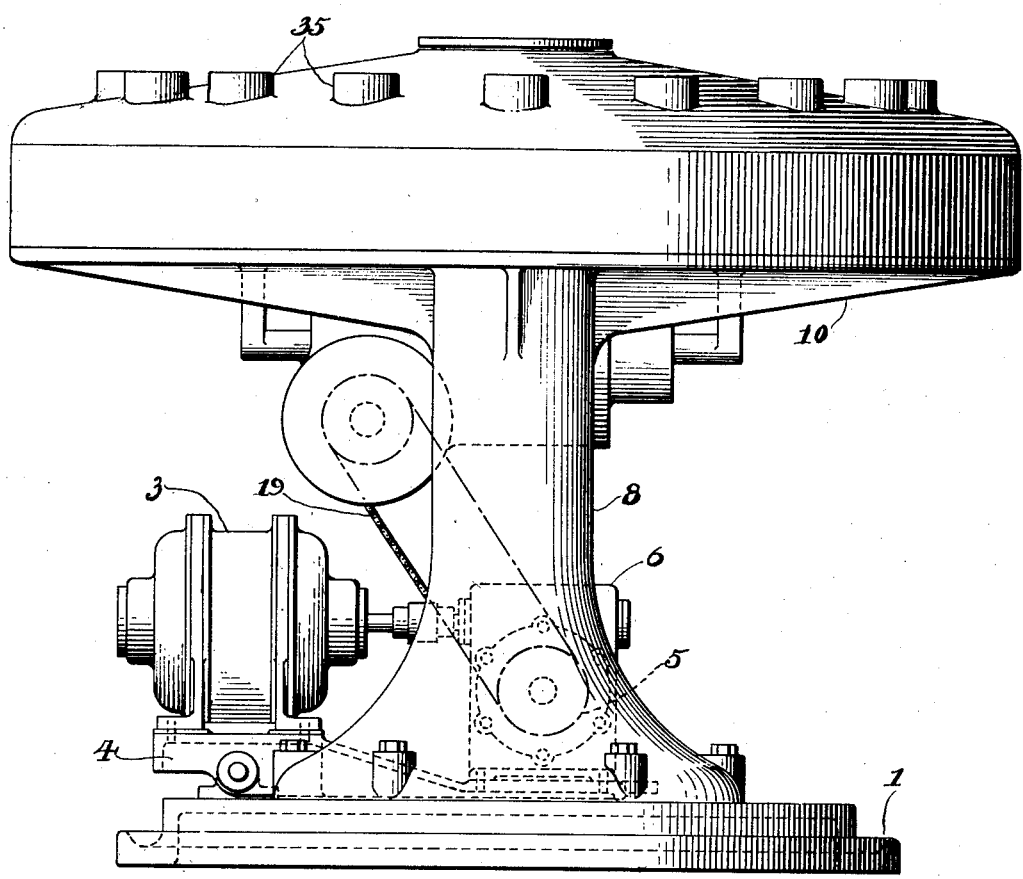
Figure 1 is a view in elevation of the machine according to the invention, showing the relation between the main driving mechanism and the rotary head of the machine.

Referring more particularly to Figure 1, the numeral 1 represents a base which is of suitable material for supporting the weight of the machine and which is adapted to be secured to the floor in any convenient manner, as by bolts, passing through the holes 2. Mounted on the base 1 is a driving motor 3, which may be of any suitable design, preferably one for maintaining a uniform speed. Motor 3, instead of being mounted directly on the base 1, is preferably bolted to a frame 4 which may be adjustably pivoted to base 1, in order to adjust the tension of the main driving belt 19.

The shaft of motor 3 is coupled to a pulley 5 through a suitable speed reduction gearing (not shown) within the gear box 6, which is also mounted on frame 4.

Likewise, fastened to base 1, by bolts or other suitable means, is a hollow casting 8, serving as a pedestal for the operating mechanisms and having a flat table surface 9, preferably formed integrally therewith and strengthened with the radially extending fins 10. The left hand side of the table portion 9 (Figs. 2 and 3) has a rectangular cutout portion 11 having a downwardly depending flange, comprising the side wall 12 and the enlarged end walls or bracket portions 13. Attached to the bracket portions 13 by bolts, represented in Fig. 2 by numeral 13', is a casing comprising a cylindrical portion 14 for enclosing the worm gear 21 and cam 27. The casing also includes another portion 15 in which are mounted the ball bearings 16 for the worm shaft 17.

Shaft 17 at its left hand end (Fig. 3) is keyed to a pulley 18, which is driven from pulley 5 by means of a belt or chain 19. Shaft 17 also has affixed thereto a worm 20, which engages the teeth of the worm gear 21. Gear 21 is mounted on a shaft 22 which is provided with suitable bearings 23 in opposite ends of casing 14. Shaft 22 also has affixed thereto a shrouded cam 25 for oscillating the member 26, hereinafter described, for the purpose of raising and lowering the mount or stem supports. Another cam 27 is carried on the shaft 22 for the purpose of controlling the indexing movement of the rotary head 28. A bevel gear 29 is also affixed to the end of shaft 22 for rotation therewith, and is adapted to engage a corresponding bevel gear affixed to the vertical shaft 20, which carries at its upper end a cog wheel 31 (Fig. 2) for purposes hereinafter described.

The reduced upper end 32 of the casting 8 is adapted to support for rotation therearound, the hollow rotary head 28, and for this purpose suitable ball bearing races 33, 34 are provided between the standard portion 32 and the head 28. At a plurality of spaced points throughout the circumference of the head 28, there are a number of hollow bosses 35, which extend on opposite sides of the head 28 to provide suitable bearings and supports for the mount rod assemblies and lamp holders, designated generally by the numeral 36. While Fig. 2 of the drawings shows the head equipped for sixteen of these mount rod assemblies, it is to be understood that any desired number may be employed. Each mount assembly comprises in general a vertically reciprocable rod 37A, 37B, 37C, 37D, etc., provided with a set of gripper fingers adapted to receive and grip the stems 38 of the lamp or audion as described in application Serial No. 393,936. Each of the rods 37A, etc. is mounted for sliding motion within its associated hollow sleeve 39, but the rods 37 are keyed to the sleeves 39 to rotate therewith as a unit. Sleeve 39 is provided with a collar portion 40 which is adapted to be supported on a cutout depression in the end of the boss 35, as shown more clearly in Fig. 3 of the drawings. Each of the sleeves 39 carries near its lower end a cog wheel 41, by means of which the said sleeve, together with the lamp holding bracket-rods 42, may be rotated as a unit around the axis of said sleeve, at the same time that the head 28 is being revolved. As shown in Fig. 3, the members 42 carry a set of jaws 65 for receiving the main or envelope portion 66 of the lamp or audion. As described in detail in copending application Serial No. 393,936 filed September 20, 1929, each rod has its outer face provided with three longitudinal grooves through which compressed air is forced to separate the "collet" portion after the lamp has been sealed as described hereinafter.

For the purpose of effecting the rotary movement of the assemblies 36, there is mounted on the upper surface of the table portion 9 a series of idler cog wheels 43, 44—49. The intermediate wheels 44 to 48 are rotatably mounted on the upper ends of standards 44ᵃ to 48ᵃ. As shown more clearly in Fig. 4 the cog wheel 49 is mounted on a bracket member 50 which is pivotally supported as at 51 on the table 9 and provided with a fastening nut 52 by means of which said bracket may be locked in adjusted position. Also supported within the bracket 50 and one the same spindle as cog wheel 49 is a cog wheel 53. Both wheels 49 and 53 are adapted to be driven from the wheel 31 by means of a sprocket chain 53 which passes around wheels 31 and 53. Slack in chain 53 may be adjusted by turning the frame 50 about pin 51 and locking in adjusted position. Passing around the end wheels 43 and 49 is a continuous sprocket chain 54, the outer length of which engages the idler wheels 44, 45, 46, 47, 48, while the inner length engages the cog wheels 41 attached to mount rod sleeves 39. For the purpose of adjusting the slack in chain 54, the bracket which supports cog wheel 43 may be adjustably fastened to table 9 as described in connection with bracket 50. As wheel 31 rotates in the direction of the arrow, the inner portion of chain 54 moves in the direction of the associated arrow, and consequently, each of the mount rods 37A, 37B, etc. and its associated assembly 36 is rotated in a clockwise direction (Fig. 2).

As the head 28 rotates in the direction of the arrow all the mount rods 37 between the points C and D are adapted to be held in their uppermost position, while the remaining mount rods are adapted to be held in their lowermost position. For the purpose of lowering a mount rod when it reaches point D, and for raising the same mount rod when it reaches point C, said rods carry at their lower ends groove members 55. Adapted to engage the grooves in members 55 are two pins 56ᵘ and 56ᵈ, mounted respectively on opposite ends of the oscillating arm 26. Arm 26 is fastened to a short shaft 57 which oscillates in suitable bearing brackets 58, fastened to table 9. Shaft 57 carries at its left hand end (Fig. 2) an upright arm 59 which caries a pivoted link 60. Link 60 is similarly connected to an upright arm 61 on the shaft 62. Shaft 62 at its left hand end (Fig. 3) carries a crank arm 63, which is provided at its lower end with a roller 64, engaging the shrouded cam 25. As said cam rotates in the direction of the arrow, the shafts 62 and 57 are correspondingly rocked, as is the arm 26. The pin 56ᵘ on the arm 26 is shown in Figs. 2 and 3 in its raised position, having moved the mount rod 37D, which happens to be associated therewith, to its uppermost position. At the same time the pin 56ᵈ has moved the associated mount rod 37A to its down position. With the head 28 of the machine in the position shown in the drawings, the mount rod 37B and its associated assembly 36 are in the loading position. That is to say, there is placed upon the upper end of said rod a stem as described in copending application Serial No. 393,936 filed September 20, 1929. On the other hand the position of rod 37C represents that position in which there is placed the main or envelope portion 66 within the locating and supporting jaws 65.

For the purpose of producing the step-by-step or indexing motion of the head 28, the said head is provided with a plurality of rollers 67, 68, etc., there being one of these rollers for each mount rod assembly 36. The rollers 67, 68 are adapted to be engaged in pairs by opposite faces 69, 70 of the cam 27, and said cam is so designed that when the straight or concentric portion thereof is riding between two rollers 67, 68, the head 28 is maintained stationary. However, when the inclined portions of cam 27 engage said rollers, the head 28 is moved forward a distance equal to the angular distance between two mount rod assemblies. As a result of this arrangement, the head may be indexed in a highly accurate manner from position to position, and the cam 27 at the same time acts as a centering device for maintaining the head in its indexed position.

Figure 2:
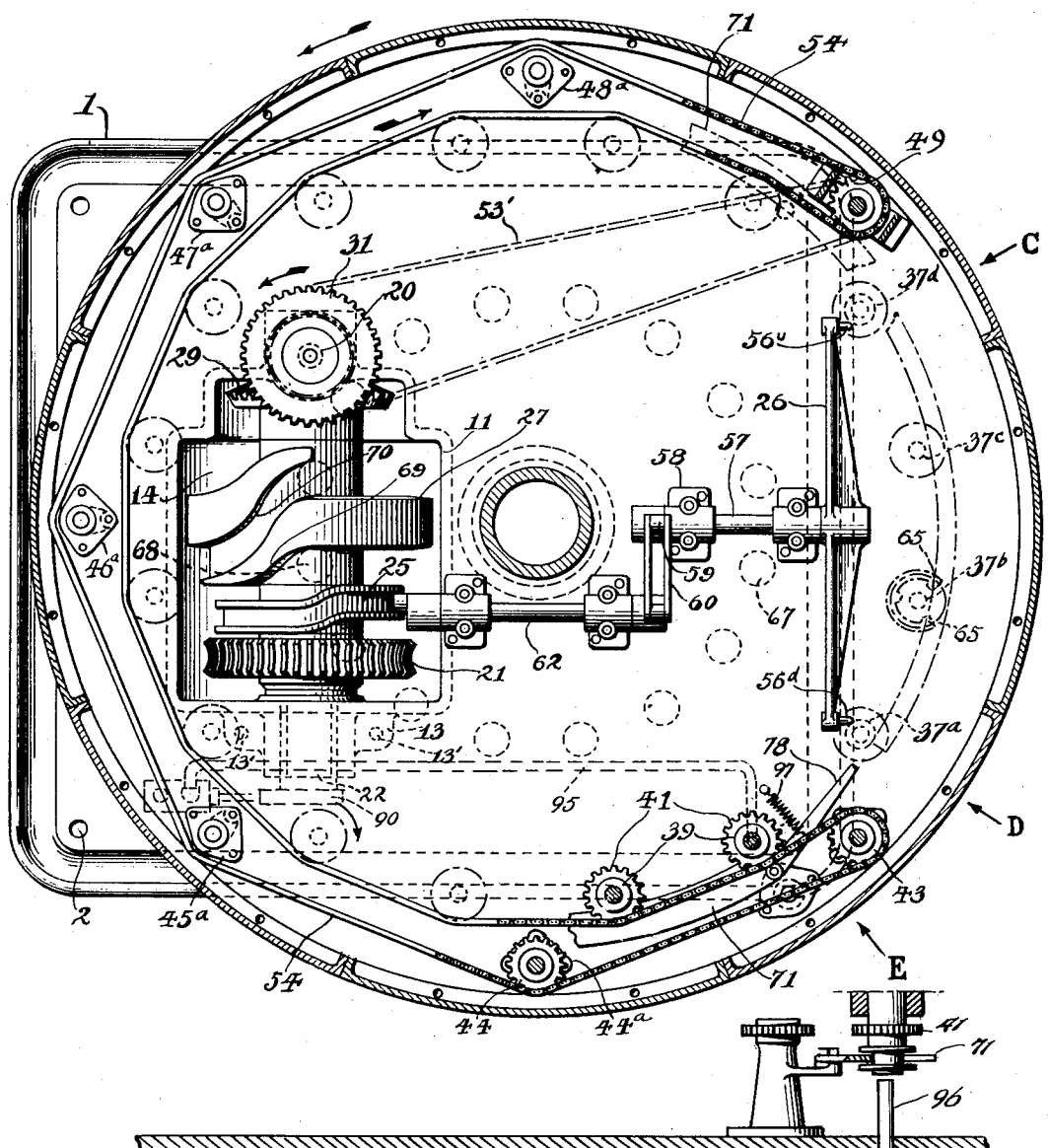
Fig. 2 is a top plan view of the machine of Fig. 1 with the rotary head removed to show the internal structure and operating mechanism therefor.

As the head 28 rotates in the direction of the associated arrow (Fig. 2) all of the mount rods, with the exception of 37A, 37B, 37C are in their uppermost position, and when in this position the grooves 55 are in registry with a track 71 attached to standards 44A, 45A, etc., and extending only partially around the table 9 as shown in Fig. 2. Consequently, during the rotation of the head thirteen of the mount rods are maintained in their uppermost position, wherein the stem portion 38 of the tube or lamp is held in engagement with the envelope portion 66 thereof, and the sealing fire 72 in front of each mount rod assembly 36 is effective in heating up the union between the said stem and said envelope.

As shown in Fig. 3 the sealing fires 72, (one or more for each position of head 28) are attached to supports 73 which in turn are fastened to the table 9. A gas manifold 74 extends around and beneath table 9 substantially from the points U to D, and each of the supports 73 is connected to said manifold at the respective indexing position of head 28. Suitable air and gas regulating valves 75, 76 are provided for each fire 38 to regulate the temperature thereof, as is well known in the glass blowing art.

Just before a mount rod assembly reaches the unloading position (represented by the position in which rod 37A is shown in Fig. 2), it is desirable that the assembly 36 be maintained in the proper position for enabling it to be later unloaded. This is to say, jaws 65 should be maintained in the position indicated in dotted lines in Fig. 2, while the head is traveling between points D and C. In order to maintain this position of the assembly 36, the grooved portion 55 of each rod 37 is provided with a "flat" 77 (Fig. 6) and pivotally attached to the end of the track 71 is an extension thereof 78, which is resiliently held in the position shown in the drawings by means of an associated spring 79. Consequently, as a mount rod "rides off" the end of track 71, the extension 78 engages the flat portion 77 of the mount rod to insure that said mount rod is in the proper position prior to its reaching the loading position. It will be noted that between the points E and C the mount rod assemblies 36 are not individually rotated about their respective axes, consequently the said rods remain in the position determined by extension 78 and the "flats" 77. After having thus been positioned, the mount rod is lowered as hereinabove described by means of pin 56D to the position represented by rod 37A (Fig. 3) wherein the groove 55 engages a corresponding track 80.

As shown in detail in Fig. 5 track 80 is attached at opposite ends to looped members 81 which in turn are fastened, as at 82, to the table 9. The portion 83 of member 81 is preferably of spring material, so as to provide a resilient engagement between the grooves 55 and track 80. This is necessary since, because of accidental displacements, a mount rod might be pulled out of proper angular position, and the flat portion 77 might otherwise bind against the end of track 80.

With the foregoing description in mind it is thought the method of operation of the machine will now be understood. Considering the head 28 of the machine in the position shown in Fig. 2, the stem 38 is inserted in the mount rod 37B, as described in the copending application Serial No. 393,936 filed September 20, 1929. The motor is then started and the head 28 is indexed in a counter-clockwise direction (Fig. 2) to the next position. That is to say the mount rod assembly 37B is now in the position represented by the numeral 37C. In this position is placed the envelope portion 66 of the lamp or audion between the jaws 65, and thereafter the head 28 is indexed to the next position. In this position (37D) the cam 25 oscillates the arm 26 as described hereinabove, and the pin $56^u$ on the end of said arm now being in alignment with the groove 55, the arm 26 causes the rod 37D to be raised sufficiently high to bring said groove in registry with the upper track 71. During this upward movement of the mount rod the stem portion 38 of the lamp is accurately centered and firmly gripped as described in detail in application, Serial No. 393,936, filed September 20, 1929, and the flare of the stem is brought into accurate engagement with the envelope portion 66 at just the right height to be heated by the sealing torches 72.

Figure 7:
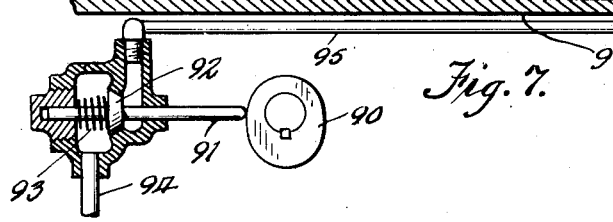
Fig. 7 is a detail view of the collet separating means.

At the same time that the rod 37D was being raised the pin 56D on the opposite end of arm 26 engages the groove 55 of the rod 37A and when said rod has left the extension 78 of track 71, rod 37A is lowered and brought into registry with lower track 80. The lamp or audion which has been raised into track 71 as described is now caused to rotate about its axis at the same time that it is advancing from one position to the next, and at the same time that it is being heated by the torches 72. The manner of rotating the lamp together with the associated assembly 36 as it passes from one position to another has been described in detail hereinabove by means of the inner length of chain 54 engaging the sprocket wheel 41 on the sleeve of the lamp holder assemblies. The lamp continues to travel and at the same time rotate about its axis until it reaches the position indicated by the letter E, at which time the stem 38 has been completely united with the envelope portion 66. At position E compressed air is forced up through the grooves in the wall of the mount and impinges against the inner face of the collet adjacent the sealing point, thus separating the collet from the lamp proper. Fig. 7 shows the manner in which the supply of air for removing the collet is controlled. Cam shaft 22 (Figs. 2 and 3) has attached thereto at one end a cam 90 which makes one revolution for each step of the head 28 and when an assembly reaches position E said cam operates valve stem 91 and raises the associated valve 92, said valve being normally closed by means of spring 93. With valve 92 thus open, air under pressure is led from a source (not shown) through pipes 94 and 95 and thence to an outlet pipe 96 which passes through base 9 at or near position E, where it is in registry with the open-grooved end of the mount rod. The compressed air then passes up through the mount rod and leaves at the upper end thereof where it is deflected against the inner wall of the collet as described in application Serial No. 393,936, referred to hereinabove. At this position, therefore, the flat portion 77 (Fig. 6) of the mount rod rides on the extension 78 until it reaches the position D where it is lowered. The collet portion 84 which has been removed from the lamp proper after the sealing operation now rests on the surface of the lamp holder assembly and by means of a suitable mechanism said collet may be ejected from the machine after the sealed envelope and stem are removed at the position D. The above cycle of operation is completed for each of the remaining lamps. While the operation in connection with one lamp has been described, it will be understood that there is a lamp positioned in each of the lamp holder assemblies, and that as shown in the drawings, twelve lamps are undergoing the sealing operation simultaneously.

While specific apparatus has been disclosed for the purpose of carrying out the several features of the invention, it will be understood that various changes may be made therein without departing from the spirit and scope of the invention. For example, while a rotary type of head is disclosed it will be understood that a longitudinal or belt-like type may be employed, and similarly while the term lamp or audion has been employed throughout the specification, it will be understood that the invention is capable of application to the uniting of the parts of any similar class of object.

What is claimed is:

1. In a lamp sealing machine, a fixed platform, a movable platform, a plurality of devices mounted for individual rotation in said movable platform, a reciprocable support rod in each of said devices, a pivoted lever for raising and lowering each rod at predetermined points in the movement of said movable platform, and a guide track for retaining said rods in raised position.

2. A machine according to claim 1 in which an additional guide track is provided for retaining said rods in lowered position.

3. A machine according to claim 1 in which the guide track is attached to the fixed platform.

4. In a machine of the character described, a moving platform, a plurality of lamp holding devices mounted for individual rotation on said platform and each including a reciprocable rod, and a pivoted lever for simultaneously raising one rod and lowering another rod.

5. A machine according to claim 4 in which the means for raising and lowering the rods includes an oscillating arm adapted to engage each set of rods in succession.

6. In a machine of the character described a moving platform, a plurality of devices each mounted for individual rotation on said platform, each device including a slidable rod, an endless flexible driving member, means for coupling each of said devices to said driving member, means for reciprocating said rod at predetermined points in the movement of said platform, and means for positively retaining said rod in its reciprocated positions, the last mentioned means including a pivoted lever.

7. In a machine of the character described a movable platform, a plurality of devices each mounted for individual rotation on said platform and adapted to support part of an article to be sealed, a first guide track, a second guide track, and lever means effective at predetermined point in the movement of said platform for moving each of said devices in succession from the first track to the second track.

8. A machine according to claim 7 in which the means for moving the devices on to and off the tracks includes an oscillating arm.

9. In a machine of the character described, a moving platform, a plurality of devices each mounted for rotation on said platform, a first track, a second track, means for moving one of said devices from the first track to the second track, and lever means for simultaneously moving another of said devices from the second track to the first track.

10. A machine according to claim 9 in which the means for rotating the devices about their own axes includes a continuously operating chain.

11. A machine according to claim 9 in which means are provided for preventing the rotation of a device about its axis when said device is on the second track.

12. A machine according to claim 9 in which each device is provided with a flat portion adapted to engage said second track to prevent rotation of each device about its own axis.

13. A machine according to claim 9 in which the first track is made in two sections, one of which is fixed and the other of which is adapted yieldingly to engage each of said devices.

14. A machine according to claim 9 in which said second track is yieldingly mounted with respect to said devices.

15. In a machine of the character described, a fixed platform, another platform adapted to move over the fixed platform and carrying a plurality of devices for holding articles to be sealed, a plurality of serially arranged sealing torches, means for moving said other platform to bring each article to be sealed successively into registry with said torches, an upper guide track, a lower guide track for said devices and lever means for moving one of said devices from the upper track to the lower track, and simultaneously moving another of said devices from the lower track to the upper track.

16. In a machine of the character described a rotatable head, a plurality of article holding devices each mounted for individual rotation on said head, a wheel carried by each device a continuously moving chain, means for meshing each of said devices with said chain in succession, and means for taking up slack in said chain.

17. In a machine of the character described a rotating head, a plurality of article holding devices mounted in said head, a loading position for said head, means for rotating said head and for individually rotating each of said devices about its own axis except when said devices reach the loading position, the last mentioned means including an endless chain looped to a substantial C shape, driver wheels carried by said holding device and adapted to mesh successively with said chain.

18. In a machine of the character described a rotatable head, a plurality of article holding devices each mounted for individual rotation in said head, a looped driving member, and means for causing said devices to be brought into mesh with the periphery of said looped member.

19. In a machine of the character described the combination of a plurality of devices each adapted to grip a lamp stem, means for mounting said devices for simultaneous rotation and revolution, a pair of tracks for guiding said devices during revolution, and means for positively moving the devices simultaneously in pairs from one track to the other.

20. In a machine of the character described the combination of a rotatable head, a plurality of devices for supporting bulbs mounted for individual rotation and reciprocating movement in said head, a guide track for said devices for positively maintaining the same in raised position, another guide track for positively maintaining the said devices in lowered position, an intermediate guide track for preventing rotation of said devices about their axis, and yieldable means carried by the first mentioned track for adjusting the angular position of each device as it leaves said first mentioned track prior to engaging said intermediate track.

RAYMOND M. ZIMBER.
LOUIS A. HAWTHORNE.